United States Patent
Dieringer et al.

(10) Patent No.: US 6,450,589 B2
(45) Date of Patent: Sep. 17, 2002

(54) BRAKE PRESSURE TRANSDUCER FOR A HYDRAULIC VEHICLE BRAKE SYSTEM

(75) Inventors: Werner Dieringer, Vallendar; Ralf Kinder, Simmern, both of (DE)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 09/728,220

(22) Filed: Dec. 1, 2000

Related U.S. Application Data (63) Continuation of application No. PCT/EP99/03913, filed on Jun. 7, 1999.

(30) Foreign Application Priority Data

Jun. 5, 1998 (DE) .......................................... 198 25 110

(51) Int. Cl.⁷ ................................................ B60T 8/32
(52) U.S. Cl. ................................ 303/114.1; 303/115.2; 303/116.2; 303/10
(58) Field of Search .......................... 303/10, 11, 114.1, 303/114.3, 116.1, 116.2, 315, 115.2

(56) References Cited

U.S. PATENT DOCUMENTS

| | | | |
|---|---|---|---|
| 4,094,554 A | 6/1978 | Leiber | 303/10 |
| 4,395,072 A | 7/1983 | Belart | 303/114.1 |
| 4,878,715 A | 11/1989 | Toda | 303/116.2 |
| 4,950,028 A | 8/1990 | Harrison | 303/115.2 |
| 5,567,021 A | 10/1996 | Gazllard | 303/3 |
| 6,033,039 A | 3/2000 | Dieringer | 303/114.3 |
| 6,106,080 A | 8/2000 | Tozu et al. | 303/10 |
| 6,161,903 A | 12/2000 | Dieringer | 303/114.1 |

*Primary Examiner*—Matthew C. Graham
(74) *Attorney, Agent, or Firm*—MacMillan, Sobanski & Todd, LLC (57) ABSTRACT

A brake pressure transducer is to be provided for a hydraulic vehicle brake system that can be actuated by initiating an actuating force (FB) via an actuating element (2) in order to generate a brake pressure for at least one wheel brake (3) by reducing the volume of a hydraulic chamber (4) and that is equipped with a brake force booster (13) in order to superimpose a primary servo force (FS1) on the initiated actuating force (FB). An additional hydraulic chamber (6) is provided whose volume likewise decreases on initiating the actuating force (FB). A pump (10, 10') is disposed between the output of the additional hydraulic chamber (6) and the at least one wheel brake (3) that pumps in the direction from the additional hydraulic chamber (6) to the at least one wheel brake (3), and the output (10a) of the pump (10, 10') is connected to the output of the hydraulic chamber (4) in order to superimpose a secondary servo force (FS2) on the initiated actuating force (FB) and/or the primary servo force (FS1).

15 Claims, 4 Drawing Sheets

BRAKE PRESSURE TRANSDUCER FOR A HYDRAULIC VEHICLE BRAKE SYSTEM

CROSS REFERENCE TO RELATED APPLICATIONS

This application is a continuation of International Application No. PCT/EP99/03913 filed Jun. 7, 1999, which claims priority to German Patent Application No. 19825110.6 filed Jun. 5, 1998.

BACKGROUND OF THE INVENTION

The invention relates to a brake pressure transducer (brake pressure generator) for a hydraulic vehicle brake system. Furthermore, the invention relates to a hydraulic vehicle brake system that is equipped with such a brake pressure transducer and also to a method of operating such a brake pressure transducer and a vehicle brake system equipped therewith.

It is generally known that, in hydraulic vehicle brake systems, the brake pressure transducer comprises a so-called main brake cylinder in order to generate a brake pressure for the wheel brake that is proportional to the actuating force initiated via the actuating element—normally a brake pedal. It is likewise generally known also to equip the brake pressure transducer with a brake force booster that superimposes a servo force to boost the actuating force initiated via the actuating element. Suitable as brake force boosters for this purpose are both pneumatic boosters, which operate on the underpressure principle, and hydraulic boosters, which employ a hydraulic pump.

Such a pneumatic brake force booster is disclosed, for example, in DE 28 45 794 C2, while such a hydraulic-brake force booster is disclosed, for example, in DE 44 43 869 A1. Both the pneumatic and the hydraulic brake force boosters have a movable partition that subdivides an internal housing space into two chambers and transmits a force via a transmission element to the main brake cylinder if the chambers are subjected to a pressure difference as a function of a force acting on the actuating element. In the unactuated state, the chambers are pressure-equalized, with the result that the movable partition does not transmit a force to the output member. In the case of the pneumatic booster, the pressure difference is produced by an underpressure being generated in one chamber by means of an underpressure source, while the other chamber is subject to atmospheric pressure. In contrast, in the hydraulic booster, the pressure difference is generated by means of a hydraulic pump whose suction side is connected to the one chamber and whose pressure side is connected to the other chamber, with the result that the hydraulic pump pumps in the direction from the one chamber to the other chamber in order to achieve a brake force boost.

Nevertheless, such a hydraulic vehicle brake system is open to improvement. Thus, the full brake force boost is needed only in about 10% of all braking actions relating to a vehicle. It is now clear that the design of the brake force boost is overdimensioned for the remaining about 90% of the braking actions. This overdimensioning has the disadvantage that a relatively large installation space is necessary in the motor vehicle, as a result of which complexity and costs occur.

Especially if a pneumatic brake force booster is used, there is a direct relationship between booster power and overall size, that is to say the greater the booster power required, the larger is the brake force booster. Since the required booster power depends substantially on vehicle weight, so-called tandem boosters—that is to say, in principle, two brake force boosters arranged behind one another—have to be predominantly used in higher vehicle classes, as a result of which further installation space is needed in addition. A pneumatic brake force booster furthermore has the disadvantage that an underpressure source has to be provided in the vehicle. True, in the case of a vehicle equipped with a petrol engine, the underpressure generated in the intake system can in principle be used. However, severe fluctuations in the underpressure generated in this way can adversely affect the performance of the brake system, in particular with regard to the ever-increasing performance requirements in the future, so that complexity and costs of providing an independent underpressure source are unavoidable.

The object of the invention is therefore to provide an improved hydraulic vehicle brake system that can be produced in more compact form and with a lower cost expenditure and can also be actuated comfortably.

This object is achieved according to the invention with a brake pressure transducer that has the features disclosed herein.

SUMMARY OF THE INVENTION

According to the invention, the quantity of brake fluid that accrues because of the reduction in the volume of the additional hydraulic chamber at the input side of the pump is additionally fed, when the brake pressure transducer is actuated, by means of the pump to the quantity of brake fluid accruing in the wheel brake because of the reduction in the volume of the hydraulic chamber. The said quantity of brake fluid additionally fed into the wheel brake by means of the pump has the effect that a higher brake pressure than the brake pressure originally generated in the hydraulic chamber is established in the wheel brake or in the hydraulic chamber. In this way, a secondary servo force is provided by means of which a boost in the actuating force initiated via the actuating element and/or the primary servo force provided by the brake force booster can be achieved in a particularly advantageous way. The total actuating force of the brake pressure transducer is consequently made up of the initiated actuating force, the primary and the secondary servo force.

Under these circumstances, the disadvantages explained above in the case of the use of a generally known brake force booster are avoided since the brake force booster providing the primary servo force has to apply a substantially lower boost. In the case of a pneumatic brake force booster, this means specifically that a single booster having a diameter of 6 inches is adequate for a vehicle that, in the case of a conventional brake force system, would have to be equipped at least with one tandem booster having a diameter of 8 and 9 inches. In addition, because a substantially "weaker" pneumatic brake force booster is adequate, the underpressure source can also be "weaker" and to that extent can be designed more simply and with a lower cost expenditure. Since a "weaker" pneumatic brake force booster is also less sensitive to fluctuations in the underpressure, the underpressure generated by reason of principle in the intake system can be utilized in a less critical way in the case of a vehicle equipped with a petrol engine.

A further substantial advantage is that two servo forces are applied that are independent of one another. This consequently comprises a redundancy should a failure occur either of the brake force booster providing the primary servo force or the pump providing the secondary servo force, as a result of which a decisive contribution is made to increasing the safety of the vehicle brake system.

The brake force booster may be a brake force booster in the conventional sense that superimposes a fixed primary servo force on the actuating force initiated via the actuating element. On the other hand, it may be an electronically controllable brake force booster that can be controlled by means of an electrical actuator in order, firstly, to actuate the brake pressure transducer instead of or in addition to an actuation via the actuating element and, secondly, to adjust the primary servo force. Suitable as an electrical actuator is, preferably, a solenoid valve arrangement that is incorporated in the electronically controllable brake force booster in an installation space-saving manner. As a result of the use of an electronically controllable brake force booster, the vehicle brake system becomes particularly suitable for emergency or spot braking actions and also automatic braking procedures, for example, for regulating vehicle dynamics, drive slip and distance.

In an advantageous manner, the regulating behaviour of the vehicle brake system with regard to actuating comfort, which means reactions on the actuating element (brake pedal), and metering capability are improved if the delivery rate of the pump can be controlled by means of an electrical actuator in order to adjust the secondary servo force. To be preferred here as an electrical actuator is an electric motor whose rotational speed can be regulated in order to adjust the delivery rate.

Furthermore, a valve device can be provided through which, in a first position, a fluid connection exists between the output of the additional hydraulic chamber and the output of the hydraulic chamber only via the pump and, in a second position, a fluid connection exists directly between the output of the additional hydraulic chamber and the output of the hydraulic chamber. If the valve device is in its second position, the pump is as it were shunted, with the result that no secondary servo force is provided. Consequently, the actuating force initiated via the actuating element is boosted only by the primary servo force provided by the brake force booster, and, as already mentioned, this is adequate for about 90% of vehicle braking actions. Consequently, the pump could be driven continuously, for example, by an operative coupling of the pump with drive unit, present in any case in a vehicle, simply existing by means of a drive belt. Only if one of the full vehicle braking actions having a proportion of about 10% already mentioned has to be performed, does the valve device assume its first position so that the secondary servo force is additionally provided via the pump. For this purpose, the valve device is preferably electromagnetically actuable, in which connection it assumes its first position as an actuating position and its second position as its basic position under spring actuation.

Since vehicle brake systems normally have two separate brake circuits, provision is made that there is connected in series with the hydraulic chamber a second hydraulic chamber whose volume likewise decreases when the brake pressure transducer is operated in order to generate a brake pressure for at least one further wheel brake. Consequently, the two hydraulic chambers can each generate in a braking circuit assigned to them a brake pressure for the respective wheel brakes, regardless of whether, for example, a diagonal partitioning or a front/rear partitioning is provided for the vehicle.

So that the same brake pressure is established in the brake circuits, the brake pressure transducer is designed so that, when the brake pressure transducer is actuated, the volume of the second hydraulic chamber decreases to the same extent as the volume of the hydraulic chamber. Ideally, the second hydraulic chamber is formed by a floating piston disposed in an axially sealing and displaceable manner in a common bore of the brake pressure transducer separating the two hydraulic chambers from one another.

So that a secondary servo force of the order of magnitude of the primary servo force provided by the brake force booster can be achieved, the brake pressure transducer is dimensioned so that, when the brake pressure transducer is actuated, the volume of the hydraulic chamber decreases to a percentagewise lesser extent than the volume of the additional hydraulic chamber.

To control the brake pressure transducer, an electronic control unit is provided that determines at least one variable relating to the actuation of the brake pressure transducer by means of sensors in order to activate the electrical actuators as a function thereof. In this connection, the variable(s) relating to the actuation of the brake pressure transducer may, for example, be the brake light switch signal, the distance initiated at the actuating element, the force initiated at the actuating element, the speed with which the actuating element is actuated, the pressure difference accruing in the brake force booster, the pressure generated in the hydraulic chamber and variables derived therefrom. The actuators, if they are electrically drivable, may be, for example, the electric motor driving the pump, the valve device shunting the pump and the solenoid valve arrangement controlling the brake force booster. This makes it possible in the simplest application case for the pump to be actuated only if the actuating element is actuated, with the result that drive energy is reduced and permanently occurring drive noises are avoided.

A decisive contribution is made to reducing components and consequently costs if an anti-lock/drive-slip regulating device is disposed between the brake pressure transducer and the wheel brake, the pump being a component of the anti-lock/drive-slip regulating device. As a result, the secondary servo force is provided by means of the pump present in any case in the anti-lock/drive-slip regulating device. Furthermore, this results in the advantage with regard to reduction of installation space that the brake pressure transducer and the anti-lock/drive-slip regulating device can be integrated to form a compact assembly. Furthermore, as a result of the integration, the connecting lines otherwise necessary between the brake pressure transducer and the anti-lock/drive-slip regulating device are unnecessary, as a result of which the risk of leakages is minimized and system safety is gained.

In this connection, there is provided for the anti-lock/drive-slip regulating device an electronic control unit that determines at least one variable relating to the dynamic behaviour of the vehicle by means of sensors in order to control, as a function thereof, the brake pressure in the at least one wheel brake by means of electrical actuators. The variable(s) relating to the dynamic behaviour of the vehicle is/are, for example, the wheel or vehicle speed(s), wheel or vehicle deceleration(s) and reference values derived therefrom; if the vehicle brake system is also designed for vehicle dynamics regulation, the variable(s) is/are the longitudinal or transverse acceleration and the steering angle of the vehicle and, if the vehicle brake system is designed for distance regulation, the distance from an obstacle.

There is therefore an advantage if the electronic control unit of the brake pressure transducer and the electronic control unit of the anti-lock/drive-slip regulating device communicate with one another via data lines or a common electronic control unit is provided for the brake pressure transducer and the. As a result, operation of the brake pressure transducer is possible as a function of the operating state of the anti-lock/drive-slip regulating device and vice versa. In particular, however, the electrical actuators of the brake pressure transducer can be controlled as a function of the variable(s) relating to the dynamic behaviour of the vehicle, and equally, the electrical actuators of the anti-lock/drive-slip regulating device can be controlled as a function of the variable(s) that relate to the actuation of the brake pressure transducer and that represent, inter alia, the braking requirement of the vehicle driver. If the electronic control units of the brake pressure transducer and of the anti-lock/drive-slip regulating device are designed as separate units, a bus system present in any case in the vehicle, such as, for example, a CAN bus, can advantageously be concomitantly used as data line for the communication.

A particularly advantageous method of operation consists in that, if the gradient of brake pressure to total actuating force is determined by the initiated actuating force and/or the primary servo force and the gradient of brake pressure to total actuating force drops below a preset gradient, the secondary servo force is superimposed on the initiated actuating force and/or the primary servo force to such an extent that the preset gradient is at least maintained. This results in a very economical mode of operation, in particular if the gradient of brake pressure to total actuating force is determined by the initiated actuating force and the primary servo force, as in the case of a conventional brake pressure transducer. Consequently, the secondary servo force has to be additionally applied by the pump only if the primary servo force provided by the brake force booster has been applied, that is to say the run-out point of the brake force booster compared with a conventional brake force transducer has been reached. The boost characteristic is therefore extended beyond the run-out point by means of the secondary servo force provided by the pump from the time when the run-out point is reached. An application example of this is formed by the vehicle braking actions already mentioned at the outset having a proportion of 10% for which a high (full) braking force boost is needed.

Furthermore, it is particularly advantageous for the operation to proceed in such a way that, if the gradient of brake pressure to total actuating force is determined by the initiated actuating force and/or the primary servo force and is equal to a preset gradient and at least one variable relating to the actuation of the brake pressure transducer differs from a preset value and/or at least one variable relating to the dynamic behaviour of the vehicle deviates from a preset value, the secondary servo force is superimposed on the initiated actuating force and/or the primary servo force to such an extent that the gradient of brake pressure to total actuating force is equal to a further preset gradient that is greater than the preset gradient. If the gradient of brake pressure to total actuating force is determined by the initiated actuating force and the primary servo force, as in the case of a conventional brake pressure transducer, the secondary servo force is consequently additionally applied in this case compared to a conventional brake pressure transducer already before the run-out point of the brake force booster is reached. A switchover to a steeper boost characteristic thus takes place. An application example of this is an emergency or spot braking action that is performed if the driver's requirement that results from the variable(s) relating to the actuation of the brake pressure transducer demands a higher vehicle deceleration than the actual vehicle deceleration that results from the evaluation of the variable(s) relating to the dynamic behaviour of the vehicle.

So that the full boost is applied by the brake pressure transducer, the preset gradient is equal to the gradient that results at maximum primary servo force. Furthermore, the further preset gradient corresponds to the gradient that results at maximum primary servo force and maximum secondary servo force.

DETAILED DESCRIPTION OF THE INVENTION

Figure 1:
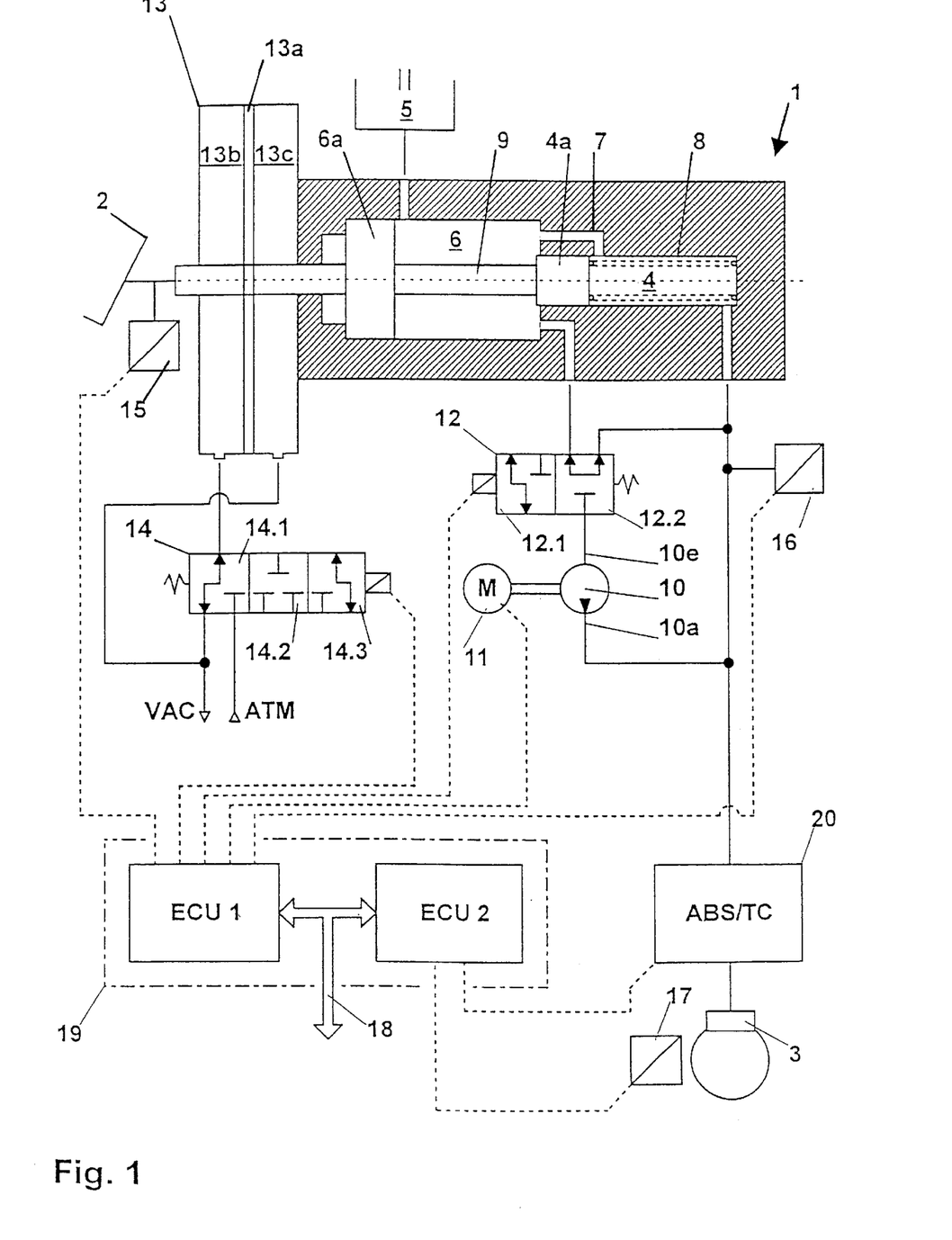
FIG. 1 shows diagrammatically a hydraulic vehicle brake system having a brake pressure transducer according to the invention.

The hydraulic brake system shown in FIG. 1 has a brake pressure transducer 1 that can be actuated via a brake pedal 2 in order to generate a brake pressure for a wheel brake 3. The brake pressure is generated in a hydraulic chamber 4 to which the wheel brake 3 is connected.

A reservoir 5 is provided to supply brake fluid. The reservoir is connected to an additional hydraulic chamber 6 that is connected via a channel 7 to the hydraulic chamber 4. However, provision may also be made for the reservoir 5 to be connected to the hydraulic chamber 4 instead of to the further hydraulic chamber 6 or for the further hydraulic chamber 6 and the hydraulic chamber 4 to be connected to the reservoir 5 so that the channel 7 for connecting the chambers 6, 4 is unnecessary.

To generate the brake pressure, the hydraulic chamber 4 is bounded on one side by an axially displaceable piston 4a. The piston 4a is displaced when the brake pressure transducer 1 is actuated by initiating an actuating force FB via the brake pedal 2. A spring arrangement 8 opposes the displacement of the piston 4a when the brake pedal 2 is actuated and has the effect that the brake pressure transducer 1 assumes the basic position as shown in FIG. 1 in the unactuated state. In the basic position, the piston 4a assumes a position in which the channel 7 connecting to the additional hydraulic chamber 6 is open, with the result that the hydraulic chamber 4 is connected to the reservoir 5. If, on the other hand, the brake pressure transducer is transferred to its actuation position, the channel 7 is sealed as a result of the displacement of the piston 4a to the right and the volume of the hydraulic chamber 4 decreases, as a result of which a brake pressure p is generated for the wheel brake 3. In this connection, the brake pressure p results in a known manner as a function of the actuating force FB initiated via the brake pedal 2 and the working area $A_4$ of the piston 4a ($p=FB/A_4$). Since the working area $A_4$ of the piston 4 is a known system parameter that, as a rule, does not change, the brake pressure p generated for the wheel brake 3 is proportional to the actuating force FB (p~FB) initiated via the brake pedal 2.

The additional hydraulic chamber 6 already mentioned is bounded on one side by an axially displaceable further piston 6a that is displaced to the right likewise when the brake pedal 2 is actuated. Since the pistons 6a, 4a are coupled via a rigid connecting member 9, the pistons 6a, 4a are displaced synchronously in the axial direction against the action of the spring arrangement 8 when the brake pedal is actuated. As a result of the operational coupling of the pistons 6a, 4a, the spring arrangement 8 has the effect that, if the brake pedal 2 is unactuated, the further piston 6a also assumes its basic position in which the additional hydraulic chamber 6 is connected to the reservoir 5.

To boost the actuating force FB initiated via the brake pedal 2, a brake force booster 13 provides a primary servo force FS1. The brake force booster 13 has a housing that is subdivided by a movable partition 13a into a pressure chamber 13b and a vacuum chamber 13c, the movable partition 13a having an operational coupling to the pistons 6a, 4a of the brake pressure transducer. The vacuum chamber 13c is connected to a vacuum source VAC that is not shown in greater detail, while the pressure chamber 13b can be connected to the surrounding atmosphere ATM. If the pressure chamber 13b is connected to the atmosphere ATM, a pressure difference becomes operative at the movable partition 13a, as a function of which the primary servo force FS1 is generated in order to superimpose the actuating force FB initiated via the brake pedal. If, on the other hand, the pressure chamber 13b and the vacuum chamber 13c are connected together, no pressure difference is operative at the movable partition 13a and no primary servo force FS1 is generated.

The brake force booster 13 can be electronically controlled by an electromagnetically actuated 3/3-way valve 14. In a first position 14.1 (spring-actuated basic position), the pressure chamber 13b and the vacuum chamber 13c are connected together so that no pressure difference is operative at the movable partition 13a or a pressure difference existing at the movable partition 13a is eliminated. In a second position 14.2, the pressure chamber 13b and the vacuum chamber 13c are separately shut off so that a pressure difference existing at the movable partition 13a is (constantly) maintained. In a third position 14.3, the pressure chamber 13b is connected to the surrounding atmosphere ATM so that, because of the connection of the vacuum chamber 13c to the vacuum source VAC, a pressure difference is built up at the movable partition 13a or a pressure difference existing at the movable partition 13a is increased. Consequently, the pressure difference at the movable partition 13a and, consequently, the primary servo force FS1 can be comfortably adjusted by consecutive interchanges between the positions 14.1, 14.2 and 14.3. It is likewise important that, because of the electronic control capability of the brake force booster 13, it is possible to actuate the brake pressure transducer not only additionally to actuation via the brake pedal 2, but also instead of an actuation via the brake pedal 2.

In order to boost further the actuating force FB initiated via the brake pedal 2 and/or the primary servo force FS1 generated by the brake force booster 13, a hydraulic pump 10 is provided that generates a secondary servo force FS2, with the result that the total actuating force of the brake pressure transducer results from an initiated actuating force FB, and primary and secondary servo forces FS1, FS2. For this purpose, the additional hydraulic chamber 6 is connected to the input side 10e of the hydraulic pump 10, whose output side 10a is connected to the wheel brake 3 or the hydraulic chamber 4. If the brake pedal 2 is actuated, the connection of the reservoir 5 to the additional hydraulic chamber 6 is also shut off by the displacement of the further piston 6a and the volume of the additional hydraulic chamber 6 is reduced. The excess brake fluid due to the decrease in volume is pumped by means of the hydraulic pump 10 into the wheel brake 3 or the hydraulic chamber 4 and, if the initiated actuating force FB and/or primary servo force FS1 does not change, results in an increase in the brake pressure p or, in other words, the initiated actuating force FB and/or the primary servo force FS1 are boosted by the secondary servo force FS2.

Figure 2:
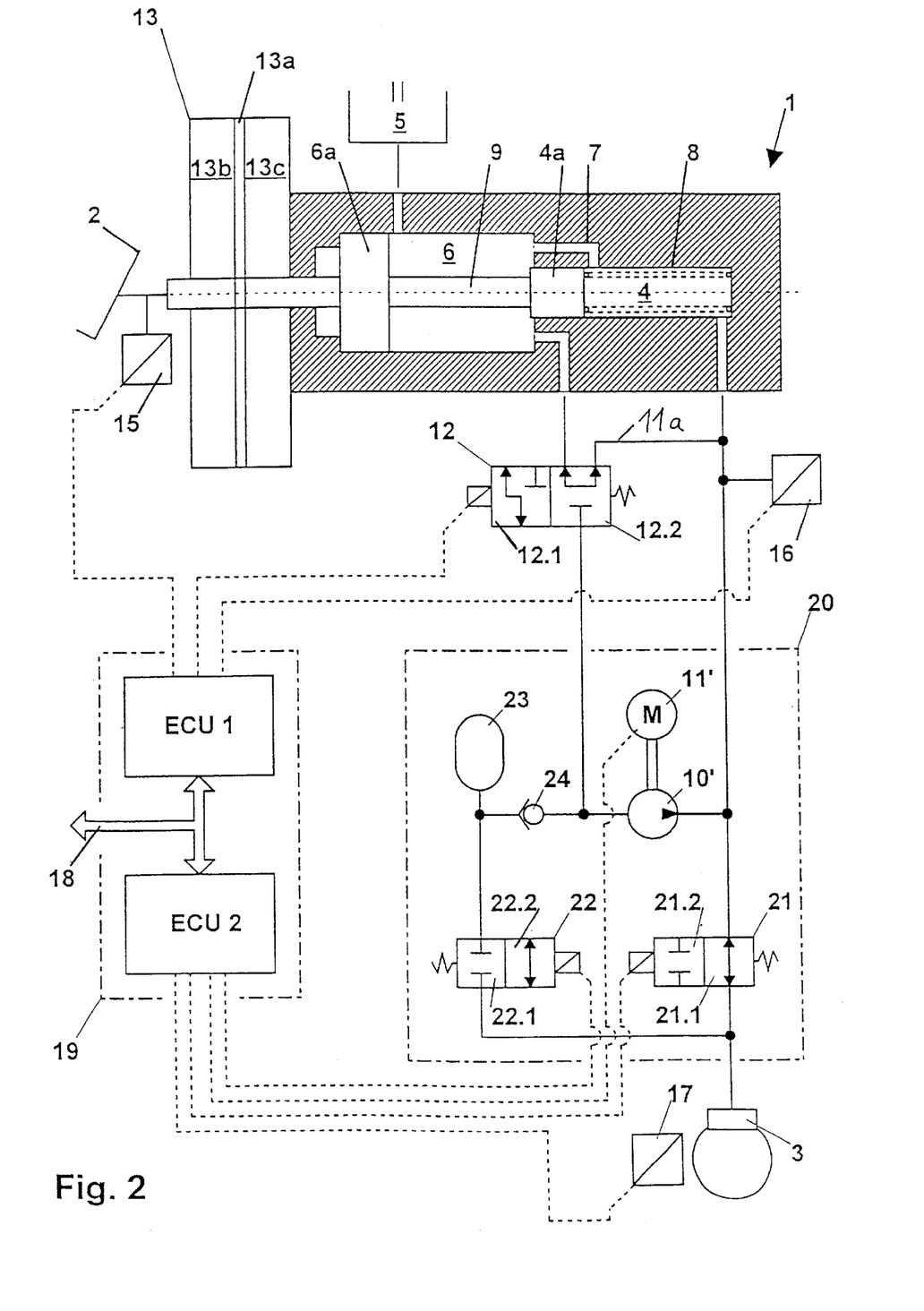
FIG. 2 shows diagrammatically an alternative hydraulic vehicle brake system having a brake pressure transducer according to the invention.

In this connection, the extent of the boost brought about by the secondary servo force FS2 depends on how the volumes of the hydraulic chambers 6,4 change in relation to one another when the brake pedal 2 is actuated. In particular, to achieve a boost of the order of magnitude of a generally known (pneumatic) brake force booster, the volume of the hydraulic chamber 4 has to decrease to a lesser extent when the brake pedal 2 is actuated than the volume of the additional hydraulic chamber 6. Assuming a cylindrical shape of the hydraulic chambers 6, 4 and a synchronous displacement of the pistons 6a, 4a by the same distance s in the axial direction when the brake pedal 2 is operated, the volumes of the hydraulic chambers 6, 4 depend only on the working areas $A_6$, $A_4$ of the pistons 6a, 4a. This means that the working area $A_6$ of the further piston 6a has to be greater than the working area $A_4$ of the piston 4a so that the volume of the hydraulic chamber 4 decreases to a lesser extent than the volume of the additional hydraulic chamber 6. Referring to FIGS. 1 and 2, it should also be pointed out that here the working area $A_6$ is to be understood as meaning the cross-sectional area of the further piston 6a less the cross-sectional area of the connecting member 9 and the working area $A_4$ is to be understood as meaning the cross-sectional area of the piston 4a. In this connection, the extent of the boost or the transmission ratio i can easily be determined according to the relationship $i=1+A_6/A_4$. Compact dimensions of the brake pressure transducer 1, for example a diameter of the piston 4a of 10 mm, a diameter of the further piston 6a of 24.5 mm and a diameter of the connecting member 9 of 4.5 mm result in a transmission ratio of i=5. For the special case where the working areas $A_6$, $A_4$ are equally large ($A_6=A_4$), the transmission ratio is i=2.

The hydraulic pump 10 could be driven permanently, for which purpose an operational coupling of the hydraulic pump 10 to a drive unit present in any case in the vehicle would be conceivable, and this is easily achievable, for example, by means of a drive belt. In this case, with the brake pedal 2 unactuated, no brake pressure would be generated in accordance with the mode of operation in the wheel brake 3 since, in that case, brake fluid is only pumped around from the additional hydraulic chamber 6 via the further channel 11a of the hydraulic pump 10 via the hydraulic chamber 4 and the channel 7. On the other hand, if the brake pedal 2 is actuated, a brake pressure is generated in the wheel brake 3 in the manner explained above since, in that case, the hydraulic chambers 6, 4 are not connected together so that circulatory pumping of brake fluid is impossible.

However, it is better not only for reasons of reducing drive energy if a drive to actuate the hydraulic pump 10 takes place only if the brake pedal 2 is actuated or a generation of the secondary servo force FS2 is in fact required. An electric motor 11 is therefore provided to drive the hydraulic pump 10 and is activated by an electronic control unit ECU1. The electronic control unit ECU1 determines by means of sensors 15, 16 variables relating to the actuation of the brake pressure transducer and evaluates them in order, as a function thereof, to activate not only the electric motor 11 but also the electromagnetically actuated 3/3-way valve 14 to establish the primary servo force FS1. In this connection, the sensor 15 determines, for example, the actuation distance, the actuating speed or the actuating force at the brake pedal 2, while the sensor 16 determines the brake pressure generated in the hydraulic chamber 4. In the simplest case, the sensor 15 corresponds to the brake light switch that is present in any case in the vehicle and that shows the state of actuation of the brake pedal 2 as a logic on/off signal, as a function of which the electric motor 11 is actuated whenever the brake pedal 2 is actuated.

Provision can also be made that the electronic control unit ECU1 can alter the rotational speed of the electric motor 11 via the signal activating the electric motor 11 in order to adjust the delivery rate of the hydraulic pump 10 variably. Ideally, this takes place as a function of the variable(s) relating to the actuation of the brake pedal 2. The sensors for determining the variable relating to the actuation of the brake pedal 2 may, however, also be disposed inside the brake pressure transducer 1 if, for example, the pressure difference accruing at the movable partition in the brake force booster 13 or the displacement distance of the pistons 6a, 4a is to be determined. The determination of the displacement distance of the pistons 6a, 4a is advantageous. Since, namely, the working area $A_6$ of the piston 6a is a known system variable that does not as a rule change, the alteration in the volume $V_6$ of the additional hydraulic chamber 6 occurring when the brake pedal 2 is actuated is proportional to the displacement distances by which the further piston 6a is displaced axially ($V_6 \sim s$). Consequently, there is the possibility of adjusting the delivery rate of the hydraulic pump 10 as a function of the alteration in the volume of the additional hydraulic chamber 6, as a result of which a virtually ideal regulating behaviour can be achieved.

The hydraulic pump 10 is designed only for one pumping direction, namely from the additional hydraulic chamber 6 to the wheel brake 3. So that the hydraulic pump 10 cannot be passed through in the direction from the wheel brake 3 to the additional hydraulic chamber 6, the hydraulic pump 10 has, on the input and output sides 10e, 10a, nonreturn valves that are preferably incorporated in the hydraulic pump 10 and for that reason are not shown. This achieves the result that, with the brake pressure transducer 1 actuated and the hydraulic pump 10 not actuated, that is to say with the electric motor 11 not activated, a brake pressure can be kept constant in the wheel brake 3 at least for a time.

Disposed between the outputs of the hydraulic chambers 4, 6 and the input side 10e of the hydraulic pump 10 is an electromagnetically actuated 3/2-way valve 12 that is activated by the electronic control unit ECU1. In the first position 12.1, there is a direct connection between the additional hydraulic chamber 6 and the wheel brake 3 only via the hydraulic pump 10. In the second position 12.2 (spring-actuated basic position), there is a direct connection between the additional hydraulic chamber 6, the hydraulic chamber 4 and the wheel brake 3, the connection to the hydraulic pump 10 being shut off, that is to say the hydraulic pump 10 is shunted.

If the valve device 12 is in its first position 12.1, brake fluid from the additional hydraulic chamber 6 can reach the wheel brake 3 only via the actual actuator, namely the hydraulic pump 10, and this is important, in particular, for achieving the abovementioned regulating behaviour during which the delivery rate of the hydraulic pump 10 is adjusted. Therefore, as soon as the brake pedal 2 is actuated or the secondary servo force FS2 has to be provided, the valve device 12 is transferred to its first position 12.1. When the actuation of the brake pedal 2 is cancelled or the secondary servo force FS2 is no longer necessary, the valve device 12 is returned to its second position 12.2 so that brake fluid can flow back out of the wheel brake 3 not only via the hydraulic chamber 4 and the channel 7, but also via the additional hydraulic chamber 6 into the reservoir 5. When the actuation of the brake pedal 2 is cancelled, this avoids the brake pressure in the wheel brake 3 reducing with a comparatively smaller time gradient than the time gradient with which the brake pressure in the wheel brake 3 increases when the brake pedal 2 is actuated. This therefore results in a not insignificant improvement in the dynamic behaviour of the hydraulic brake system. Ideally, the characteristic of the hydraulic brake system is designed so that the time gradients during the pressure increase and the pressure reduction are identical.

It goes without saying that, instead of the electromagnetic actuation, the valve device 12 can have a pressure-controlled actuation, the pressure actuation preferably taking place as a function of a pressure generated in the additional hydraulic chamber 6. Alternatively, the valve device 12 may also have means for adjusting the flow rate in order to adjust the delivery rate of the hydraulic pump 10 indirectly if the delivery rate of the hydraulic pump 10 is itself constant (not adjustable). Furthermore, there is the alternative of using a hydraulic pump that is designed for two pumping directions, as a result of which the valve device 12 can be eliminated.

Provided between the brake pressure transducer 1 and the wheel brake 3 is an anti-locking regulating device 20 that is activated via an electronic control unit ECU2. For this purpose, the electronic control unit ECU2 determines variables relating to the dynamic behaviour of the vehicle, for which purpose the rotational behaviour of the vehicle wheel assigned to the wheel brake 3 is determined by means of sensors 17. The electronic control units ECU1, ECU2 of the brake pressure transducer 1 and of the anti-locking regulating device 20 communicate with one another via at least one communication line 18 in order to exchange data. There is, however, also the possibility of combining the electronic control units ECU1, ECU2 to form a common electronic control unit 19.

The alternative hydraulic vehicle brake system shown in FIG. 2 is substantially identical to the hydraulic vehicle brake system shown in FIG. 1. One difference is that the brake force booster cannot be controlled electronically so that, on the one hand, the primary servo force FS1 cannot be adjusted and, on the other hand, actuation of the brake pressure transducer cannot take place instead of actuation via the brake pedal 2. A substantial difference is, however, that the hydraulic pump 10', which is in any case a component of the anti-locking regulating device 20 also takes over the function of the hydraulic pump to generate the secondary servo force FS2.

The anti-locking regulating device 20 comprises a first and second valve 21, 22 in order to modulate the brake pressure in the wheel brake 3 by adjusting pressure buildup, pressure maintenance and pressure reduction phases. Furthermore, the anti-locking regulating device 13 comprises a reservoir chamber 23 into which brake fluid from the wheel brake is drained during a pressure reduction phase, and also the hydraulic pump 10' to pump brake fluid back from the reservoir chamber 23 into the brake pressure transducer 1 or the wheel brake 3. The valves 21, 22 can be actuated electromagnetically and the hydraulic pump 10' is driven by an electric motor 11', the appropriate activation signals being provided by the electronic control unit ECU2. If a locking tendency is detected at one of the wheels, the required activation of the valves 22 and of the hydraulic pump 10' is undertaken by the electronic control unit ECU2. In the non-activated state 21.1, the first valve 21 connects the brake pressure transducer 1 to the wheel brake 3, whereas, in the non-activated state 22.1, the second valve device 22 shuts off the connection of the wheel brake 3 to the reservoir chamber 23 so that a brake pressure can be built up in the wheel brake 3. If a brake pressure is to be kept constant in the wheel brake 3, the first valve device 21 is set to its activated state 21.2 in which the connection of the brake pressure transducer 1 to the wheel brake 3 is shut off. To reduce a brake pressure in the wheel brake 3, the first and the second valve devices 21, 22 are set to their activated states 21.2, 22.2, the connection of the brake pressure transducer 1 to the wheel brake 3 being shut off and the wheel brake 3 being connected to the reservoir chamber 23.

So that no brake fluid can escape from the additional hydraulic chamber 6 into the reservoir chamber 23 during actuation of the brake pressure transducer 1, but is fed directly to the input side of the hydraulic pump 10' for the purpose of precharging, there is disposed between the input side of the hydraulic pump 10' and the reservoir chamber 23 a nonreturn valve 24 that permits a flow connection only in the direction from the reservoir chamber 23 to the input side of the hydraulic pump 10'.

Important in this connection is that the electronic control units ECU1, ECU2 of the brake pressure transducer 1 and of the anti-locking regulating device 20 communicate with one another or a common electronic control unit 19 is present. Since the hydraulic pump 10' is activated on the part of the electronic control unit ECU2 of the anti-locking regulating device 20, the electronic control unit ECU1 of the brake pressure transducer 1 has to pass the activation requirement to the electronic control unit ECU2 of the anti-locking regulating device 20. Likewise, the electronic control unit ECU2 of the anti-locking regulating device 20 of the electronic control unit ECU1 has to inform the brake pressure transducer 1 if an anti-locking regulation is operative so that the valve device 12 is transferred into its second position 12.2 on the part of the electronic control unit ECU1 of the brake pressure transducer 1 so that the hydraulic pump 10' pumps brake fluid exclusively out of the reservoir chamber 23 during the anti-locking regulation.

Figure 4:
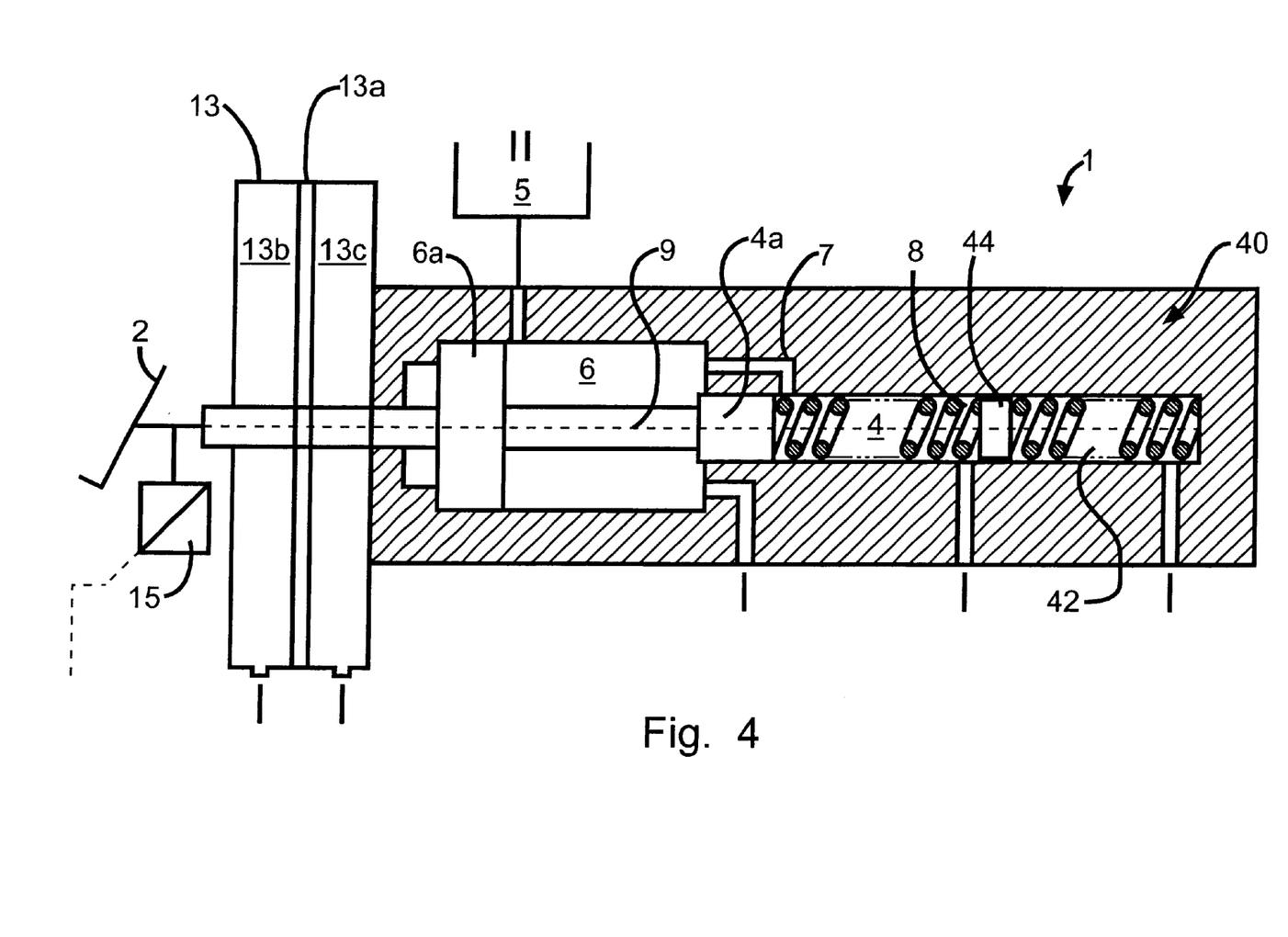
FIG. 4 shows diagrammatically another alternate vehicle brake system.

In FIGS. 1 and 2, only one brake circuit with one wheel brake is shown for simplicity. However, as shown in FIG. 4, a second brake circuit 40 may be provided with a second hydraulic chamber 42 being connected in series with the hydraulic chamber 4, a floating piston 44 separating the two chambers 4 and 40 from one another.

Figure 3:
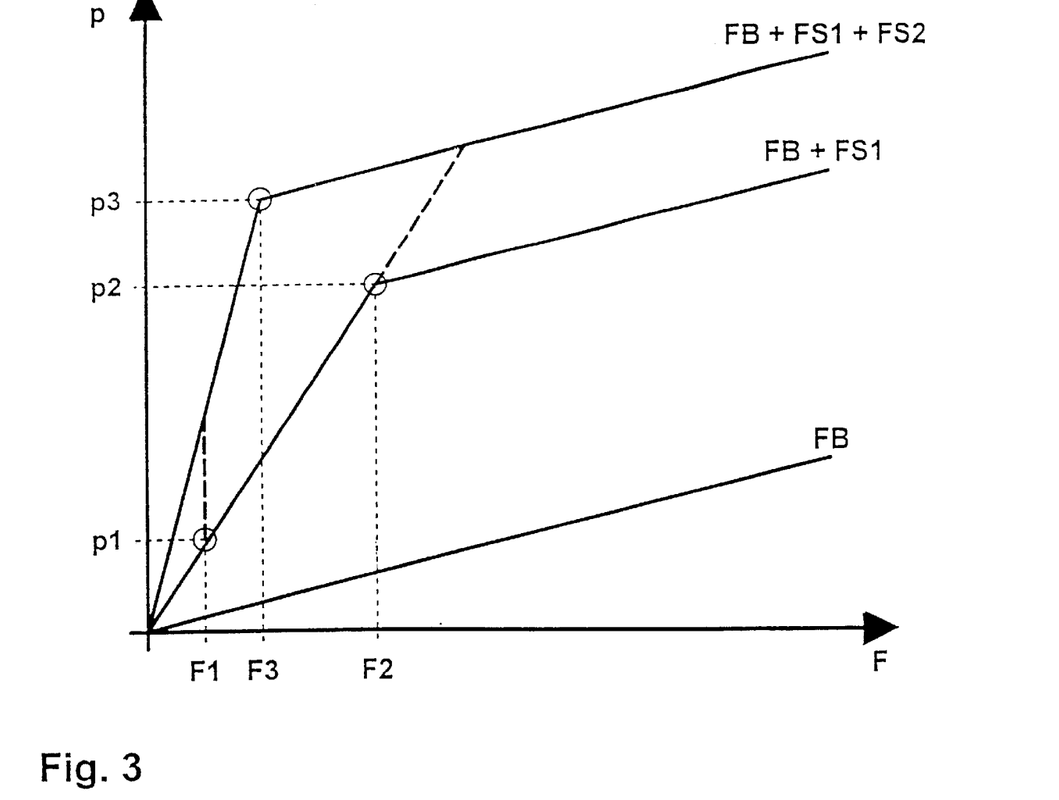
FIG. 3 shows a diagram containing the family of curves of the brake pressure transducer according to the invention.

A diagram showing the family of curves of the brake pressure transducer is depicted in FIG. 3, the brake pressure p generated being depicted as a function of the total actuating force F applied by the brake pressure transducer. As already mentioned, the total actuating force F is a function of the actuating force FB initiated via the brake pedal 2, of the primary servo force FS1 generated by the brake force booster 13 and of the secondary servo force FS2 generated by the hydraulic pump 10 or 10' (F=f (FB, FS1, FS2)).

The lower characteristic shows the case where neither the primary nor the secondary servo force FS1, FS2 is operative (FS1=0, FS2=0), that is to say the brake pressure p is generated only because of the actuating force FB. Because of the proportionality of the brake pressure p with respect to the actuating force FB, this characteristic is a straight line.

The centre characteristic depicts the case where the secondary servo force FS2 is inoperative (FS2=0), with the result that the brake pressure p is generated because of the actuating force FB and the primary auxiliary force FS1. This characteristic has two branches. The leading, steeply rising branch stands for the booster component of the primary servo force FS1, which, beyond the run-out point (F2, p2), at which the primary servo force FS1 is applied, then merges into the trailing, less steeply rising branch that originates from the actuating force FB. If the primary servo force FS1 can be adjusted, the gradient (p/F) of the leading, steeply rising branch can be varied and, consequently, the response behaviour of the brake pressure transducer can be modified.

The upper characteristic now shows the case where the brake pressure p is generated because of the actuating force FB and of the primary and the secondary servo forces FS1, FS2. This characteristic also has two branches, the leading branch having a greater slope than in the case of the centre characteristic since the leading branch stands in this case for the booster component of the primary and the secondary servo forces FS1, FS2. In this case, therefore, the result is also a higher run-out point (F3, p3), which is adjoined by the less steeply rising branch originating only from the actuating force FB. In this case too, it is possible to vary the gradient (p/F) of the leading branch by suitably adjusting the primary and/or secondary servo forces FS1, FS2 in order to vary the response behaviour.

Beyond the run-out point (F2, p2) in the case of the centre characteristic, the diagram shows, as a broken line, a straight-line extension of the leading steep branch that terminates on the trailing, less steep branch of the upper characteristic. This operating behaviour is achieved in that after the run-out point (F2, p2) is reached, that is to say if the actual gradient (p/F) were to drop below the required gradient (p2/F2), the secondary servo force FS2 is generated in addition to the primary servo force FS1 and is adjusted so that the required gradient p2/F is maintained until the upper characteristic is reached.

Furthermore, in the case of the centre characteristic the diagram shows, as a broken line, a transition to the upper characteristic beyond the point (F1, p1). This operating behaviour is achieved by bringing in the secondary servo force FS2 starting from the point (F1, p1). A switchover from the gradient (p2/F2) to the steeper gradient (p3/F3) therefore takes place. In this connection, the criterion for fixing the switch-over point (F1, p1), considered individually or in combination, may be, inter alia, the reaching of a predetermined brake pressure p or a predetermined actuating force FB, the failure to reach a predetermined vehicle deceleration or a predetermined distance to an obstacle, and also the exceeding of a predetermined time after the initiation of the vehicle braking.

The run-out point is determined, for example, with a sensor that measures the pressure in the pressure chamber 13b or the pressure difference at the movable partition 13a. For example, the run-out point may be regarded as reached if the pressure in the pressure chamber 13b is equal to the pressure of the external atmosphere (atmospheric pressure). As a modification of the exemplary embodiment described above, the run-out point or point of inflection can also be recognized by continuously determining the course of the centre characteristic according to FIG. 3 (that is to say, the characteristic FB+FS1) in a computer, the actuating force FB being determined by means of the sensor 15 and the brake pressure P by means of the sensor 16. In this way, the point of inflection can be recognized by computation, for example by observing the first derivative of the function, which changes drastically at the point of inflection. After the run-out point is reached, the secondary servo force FS2 is brought in. Because the gradient (p2/F2) that corresponds to the boost factor is known for the brake system, it can then be maintained by regulating techniques even beyond the run-out point (point of inflection in the centre curve) by the brake pressure P being used as a regulating variable and the servo force then being adjusted in such a way that the broken straight line shown in FIG. 3 is achieved for the pressure P.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Brake pressure transducer for a hydraulic vehicle brake system actuatable by applying an actuating force via an actuating element in order to generate a brake pressure for at least one wheel brake by reducing the volume of a hydraulic chamber in the brake pressure transducer, and wherein the vehicle brake system is equipped with a brake force booster in order to superimpose a primary servo force on the applied actuating force, the brake pressure transducer comprising:

a hydraulic chamber for generating a brake pressure for at least one wheel brake by reducing the volume of the hydraulic chamber, the volume of the hydraulic chamber decreases when the actuating force is applied, an additional hydraulic chamber whose volume decreases when the actuating force is applied, a pump is disposed between the output of the additional hydraulic chamber and the at least one wheel brake, the pump pumping in the direction from the additional hydraulic chamber to at least one wheel brake, and the output of the pump is connected to the output of the hydraulic chamber in order to superimpose a secondary servo force on one of the applied actuating force and the primary servo force so that the brake pressure is increased for the at least one wheel brake.

2. Brake pressure transducer according to claim 1, characterized in that the brake force booster superimposes a fixed primary servo force on the initiated actuating force.

3. Brake pressure transducer according to claim 1, characterized by an electrical actuator for controlling the brake force booster.

4. Brake pressure transducer according to claim 3, characterized by the electrical actuator for actuating the brake pressure transducer instead of an actuation via the actuating element and for adjusting the primary servo force.

5. Brake pressure transducer according to claim 3, characterized by the electrical actuator for actuating the brake pressure transducer in addition to an actuation via the actuating element and for adjusting the primary servo force.

6. Brake pressure transducer according to claim 1 characterized in that the delivery rate of the pump can be controlled by means of an electrical actuator in order to adjust the secondary servo force.

7. Brake pressure transducer according to claim 1 characterized in that a valve device is provided through which, in a first position, a fluid connection exists between the output of the additional hydraulic chamber and the output of the hydraulic chamber only via the pump and, in a second position, a fluid connection exists directly between the output of the additional hydraulic chamber and the output of the hydraulic chamber.

8. Brake pressure transducer according to claim 1 characterized by a second hydraulic chamber being connected in series with the hydraulic chamber, the volume of the second hydraulic chamber likewise decreasing when the brake pressure transducer is actuated in order to generate a brake pressure for at least one further wheel brake.

9. Brake pressure transducer according to claim 8, characterized in that when the brake pressure transducer is actuated, the volume of the second hydraulic chamber decreases to the same extent as the volume of the hydraulic chamber.

10. Brake pressure transducer according to claim 1 characterized in that when the brake pressure transducer is actuated, the volume of the hydraulic chamber decreases to a percentage-wise lesser extent than the volume of the additional hydraulic chamber.

11. Brake pressure transducer according to claim 1 characterized in that an electronic control unit is provided that determines and evaluates at least one variable relating to the actuation of the brake pressure transducer by means of sensors in order to activate the electrical actuators as a function thereof.

12. Hydraulic vehicle brake system having a brake pressure transducer according to claim 1 characterized in that an anti-locking/drive-slip regulating device is disposed between the brake pressure transducer and the wheel brake, the pump being a component of the anti-locking/drive-slip regulating device.

13. Hydraulic vehicle brake system according to claim 12, characterized in that for the anti-locking/drive-slip regulating device, an electronic control unit is provided that determines at least one variable relating to the dynamic behavior of the vehicle by means of sensors in order to control as a function thereof the brake pressure in the at least one wheel brake by means of electrical actuators.

14. Hydraulic vehicle brake system according to claim 13, characterized in that the electronic control unit of the brake pressure transducer and the electronic control unit of the anti-locking/drive-slip regulating device communicate with one another via data lines.

15. Hydraulic vehicle brake system according to claim 13, characterized in that a common electronic control unit is provided for the brake pressure transducer and the anti-locking/drive-slip regulating device.

* * * * *